UNITED STATES PATENT OFFICE 2,050,198

ACCELERATOR OF VULCANIZATION

Lorin B. Sebrell, Cuyahoga Falls, Ohio, assignor to Wingfoot Corporation, Wilmington, Del., a corporation of Delaware No Drawing. Application February 18, 1933,
Serial No. 657,471

13 Claims. (Cl. 18—53)

The herein described invention relates to a new class of rubber accelerators and to rubber vulcanized in the presence thereof. More particularly, it relates to the use of the reaction products of the mercaptans and di-, tri- and other poly-amines as accelerators of vulcanization. It has been found that when such products are employed in rubber for the purpose of expediting the cure, not only is the vulcanization of the rubber very greatly accelerated, but vulcanized rubber of good ageing and other properties is obtained.

It is known that the mercaptans and their derivatives, among them mercaptobenzothiazole, possess the property of accelerating the vulcanization of rubber. The compounds forming the subject matter of this application are derived from the mercaptans and possess marked accelerating properties. Like the mercaptans, they effect the vulcanizing process within a short period of time at relatively low temperatures. The products formed are particularly resistant to abrasion and possessed of unusual ability to withstand ageing.

These new accelerators are derived from the mercaptans by reacting them with di-, tri- and other poly-amines.

An illustrative example is the reaction product of mercaptobenzothiazole and ethylene diamine. If these substances are dissolved in alcohol in equimolar proportions, they react spontaneously to form a product, beta amino ethyl ammonium benzothiazyl sulphide, which appears to be an addition product, the reaction taking place as indicated:

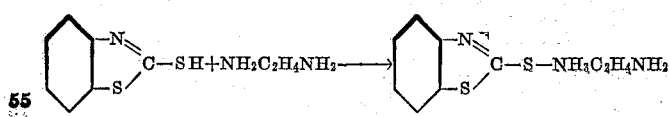

If, on the other hand, the same compounds are mixed in the proportion of two mols of mercaptobenzothiazole to one mol of ethylene diamine, a different addition product, ethylene bis (ammonium benzothiazyl sulphide) is formed:

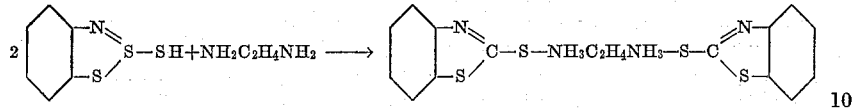

Both of these addition products, and, for that matter, mixtures thereof as well, possess accelerating properties.

Another example is the p-amino phenyl ammonium benzothiazyl sulphide produced by the addition of p-phenylene diamine to mercaptobenzothiazole. To make this product, equimolar amounts of p-phenylene diamine and mercaptobenzothiazole are separately dissolved in hot alcohol after which the solutions are mixed and allowed to cool. The product is white and crystalline. It melts at 155 to 157 degrees C. and dissolves easily in hot alcohol, but is much less soluble in cold. The reaction is probably the following:

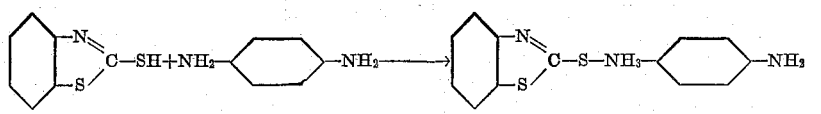

The corresponding phenylene bis (ammonium benzothiazyl sulphide) is readily prepared by employing two molar proportions of mercaptobenzothiazole instead of one.

Still another example is found in the reaction product of dibutyl ethylene diamine and mercaptobenzothiazole, formed by adding one molecular weight of dibutyl ethylene diamine to two molecular weights of mercaptobenzothiazole suspended in gasoline. The reaction is believed to proceed as follows:

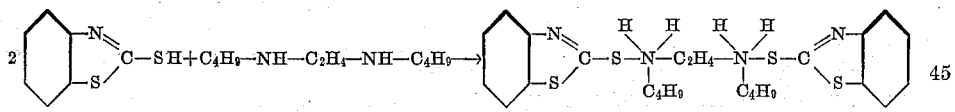

This product may be called ethylene-N-N' bis (n-butyl ammonium benzothiazyl sulphide), just as the corresponding equimolar reaction product may be called beta (n-butylamino) ethyl n-butyl ammonium benzothiazyl sulphide.

The methods given are applicable in general to any of the compounds of the classes herein described, but other methods may be used to cause the reaction. A simplified method of reacting the diamine and thiazole which may be used where conditions permit consists in merely mixing the compounds and warming them gently until the thiazole dissolves in the diamine, whereupon the reaction proceeds to completion without further assistance. It will be understood that it is not strictly necessary to allow the reactants to combine beforehand, as it is usually feasible to incorporate the reactants as such in the rubber mix, allowing any reaction or reactions which may tend to occur to be effected in the compounded stock either before or during vulcanization.

Typical mercaptans which may be used according to this invention are mercaptobenzothiazole; mercapto thiazole; the mercapto tolyl thiazoles; mercaptobenzoxazol; nitro-, amino-, halogen- and aryl-substituted mercaptobenzothiazoles, the substituents being in the benzene ring; mercaptonaphthoxazol; thio naphthol, thio phenol, amino thio phenol, amino thio naphthol, and thio cresol. Compounds such as the dithiocarbamates are not regarded as within the scope of this invention, as they are thio acid derivatives rather than mercaptans. Thus it may be said that the invention includes mercaptans, as indicated in the examples given above, but does not extend to compounds which do not have the typical structure found in thio phenol, mercaptobenzothiazole, etc.

A wide variety of poly-amines also may be used. It is preferred, in general, to use the aliphatic poly amines which have two or more primary amino groups therein; for example, ethylene diamine, butylene diamine, propylene diamine, diamino cyclohexane, diamino diethyl amine, triethylene tetra amine, diamino dipropyl amine and diamino ethyl propyl amine. Aromatic poly primary amines may, however, be used with success, examples being diamino diphenyl amine, phenylene diamine, naphthylene diamine, benzidine, tolidine, and meta toluene diamine. Still other poly-amines typical of the compounds which may be used are poly secondary amines such as dibutyl ethylene diamine, triethylene triamine, dicyclohexyl ethylene diamine, dimethyl phenylene diamine and diphenyl butylene diamine.

The invention does not extend to amids and amidines, of which urea and diphenylguanidine are examples, as these compounds are not true poly amines in that the amino groups are not separated by hydrocarbon constituents.

In accelerating the vulcanization of rubber by use of the compounds described, any of the ordinary rubber mixes may be used, the amount of accelerator necessary being determined according to the usual methods. It has been found, for example, that the accelerators of the present invention are effective in rubber compositions of the following typical formulae:

*Formula A*

| | Parts |
|---|---|
| Extracted pale crepe rubber | 100 |
| Zinc oxide | 120 |
| Gas black | 70 |
| Sulfur | 4 |
| Stearic acid | 2 |
| Accelerator | 1 |

*Formula B*

| | Parts |
|---|---|
| Extracted pale crepe rubber | 100 |
| Zinc oxide | 5 |
| Sulfur | 3 |
| Stearic acid | 1.5 |
| Accelerator | 0.5 |

Employing the reaction product of 1 mol of ethylene diamine and 1 mol of mercaptobenzothiazole as the accelerator in the compositions of Formula A and Formula B, respectively, the following testing data were obtained:

| Cure at 40# | Stress kgs./cm.² at | | | Elongation in percent at break |
|---|---|---|---|---|
| | 300% | 500% | Break | |
| *Minutes* | | | | |
| 10 | 68 | 184 | 300 | 675 |
| 20 | 90 | 217 | 320 | 625 |
| 30 | 92 | 220 | 320 | 615 |
| 40 | 92 | 220 | 292 | 600 |
| 50 | 92 | 220 | 292 | 600 |

| Cure | 500% | 700% | | Elongation at break |
|---|---|---|---|---|
| *Minutes* | | | | |
| 20/260° F | 45 | 180 | 228 | 740 |
| 40 | 55 | | 215 | 690 |
| 80 | 58 | | 205 | 680 |
| 60/285° F | 44 | 172 | 178 | 710 |

With 0.8 part of the equimolar reaction product of p-phenylene diamine and mercaptobenzothiazole as the accelerator in the rubber mix of Formula B, the following results were obtained:

| Cure at 260° F. | Stress kgs./cm.² at | | | Elongation at break |
|---|---|---|---|---|
| | 500% | 700% | Break | |
| *Minutes* | | | | |
| 10 | 20 | 62 | 88 | 765 |
| 20 | 27 | 110 | 189 | 790 |
| 30 | 42 | 177 | 195 | 715 |
| 40 | 64 | | 197 | 675 |

An accelerator formed by reacting two mols of mercaptobenzothiazole with 1 mol. of dibutyl ethylene diamine gave the following testing data when 0.5 part was used in Formula B:

| Cure at 260° F. | Stress kgs./cm.² at | | | Elongation at break |
|---|---|---|---|---|
| | 500% | 700% | Break | |
| *Minutes* | | | | |
| 5 | 9 | 22 | 68 | 940 |
| 10 | 19 | 60 | 118 | 820 |
| 15 | 28 | 102 | 148 | 765 |
| 20 | 25 | 105 | 175 | 790 |

The reaction product of 2 mols of mercaptobenzothiazole and 1 mol of ethylene diamine has also been tested as an accelerator, using 0.25 part in the last mix given above. The following values were found:

| Cure at 260° F. | Stress kgs./cm.² at | | | Elongation at break |
|---|---|---|---|---|
| | 500% | 700% | Break | |
| *Minutes* | | | | |
| 10 | 8 | 19 | 63 | 930 |
| 15 | 10 | 30 | 90 | 890 |
| 25 | 15 | 55 | 124 | 830 |
| 40 | 21 | 84 | 152 | 795 |

When ethylene dichloride is reacted with ammonia according to the usual method of forming ethylene diamine, a number of side reactions occur which produce small amounts of compounds other than ethylene diamine. These compounds appear to constitute a group of poly amines, probably for the most part triethylene triamine, diethylene triamine and triethylene tetramine. They may be used together with the ethylene diamine in forming the new accelerators or may be separated therefrom by fractional distillation and reacted independently with a mercaptan to form an accelerator. The boiling range of this group of poly amines, which will be called the ethylene polyamines, is from 200 to 275 degrees C. and the average molecular weight of the compounds is roughly estimated at 125.

Accelerators have been made by reacting mercaptobenzothiazole with these ethylene polyamines in the molecular proportions of 1:1, 3:2 and 3:1. When these compounds were tested in a rubber mix of Formula B, using 0.25 part of the reaction products as the accelerator, the following data were obtained:

Mercaptobenzothiazole and ethylene polyamines, 1:1 molecular proportions

| Cure at 260° F. | Stress kgs./cm.² at | | | Elongation at break |
|---|---|---|---|---|
| | 500% | 700% | Break | |
| Minutes | | | | |
| 10 | 7 | 17 | 58 | 950 |
| 15 | 10 | 36 | 111 | 930 |
| 25 | 16 | 56 | 132 | 840 |
| 40 | 22 | 90 | 153 | 790 |

Mercaptobenzothiazole and ethylene polyamines, 3:2 molecular proportions

| Cure at 260° F. | Stress kgs./cm.² at | | | Elongation at break |
|---|---|---|---|---|
| | 500% | 700% | Break | |
| 10 | 6 | 13 | 64 | 995 |
| 15 | 11 | 33 | 100 | 900 |
| 25 | 17 | 58 | 111 | 810 |
| 40 | 23 | 86 | 143 | 780 |

Mercaptobenzothiazole and ethylene polyamines, 3:1 molecular proportions

| | | | | |
|---|---|---|---|---|
| 10 | 5 | 8 | 35 | 990 |
| 20 | 10 | 29 | 92 | 900 |
| 30 | 14 | 45 | 123 | 870 |
| 60 | 21 | 78 | 138 | 790 |

Instead of using the new accelerators in the manner described, the primary compounds from which the accelerator is to be made may, as pointed out above, be separately incorporated in the rubber, thus causing the accelerator to be formed in the rubber. If the primary compounds are incorporated in separate batches and the batches mixed only in the final stage of the milling, the danger of premature curing will be materially lessened. To illustrate this procedure, a rubber mix was compounded using

Formula C

| | Parts |
|---|---|
| Extracted pale crepe rubber | 100 |
| Zinc oxide | 5 |
| Sulfur | 3 |
| Stearic acid | 1.5 |
| Mercaptobenzothiazole | 0.5 |
| p-Phenylene diamine | 0.3 |

The product tested as follows:

| Cure at 260° F. | Stress kgs./cm.² at | | | Elongation at break |
|---|---|---|---|---|
| | 500% | 700% | Break | |
| Minutes | | | | |
| 10 | 17 | 59 | 109 | 795 |
| 20 | 26 | | 178 | 775 |
| 30 | 44 | 184 | 206 | 715 |
| 40 | 49 | | 190 | 690 |

Another rubber mixture which differed in that it contained but 0.15 part of p-phenylene diamine instead of 0.3 part, gave the following data on testing:

| Cure at 260° F. | Stress kgs./cm.² at | | | Elongation at break |
|---|---|---|---|---|
| | 500% | 700% | Break | |
| Minutes | | | | |
| 10 | 26 | 80 | 80 | 700 |
| 20 | | 181 | 125 | 780 |
| 30 | 43 | 161 | 181 | 720 |
| 40 | 33 | 134 | 180 | 745 |

Although the reaction products of mercaptobenzothiazole with ethylene diamine, the ethylene polyamines, dibutyl ethylene diamine and p-phenylene diamine have been given as examples, it is to be noted that they are merely illustrative and that this invention extends to all of the polyamines and more particularly to all of the poly primary amines. The invention also applies to mixtures of two or more of the polyamines, since the methods now in use for the preparation of the various polyamine compounds commonly give small amounts of other polyamines which side reaction products need not necessarily be removed.

While mercaptobenzothiazole has been used throughout the specification as an example of a mercaptan, it is to be understood that the other mercaptans, particularly those in which the mercaptan radical is attached to a carbon atom of a ring structure, will react according to this invention and are equally within its scope.

This application is a continuation in part of application Serial No. 140,429, filed October 11, 1926.

It is intended that the patent shall cover, by suitable expression in the appended claims, whatever features of patentable novelty reside in the invention.

What I claim is:

1. The method of accelerating the vulcanization of rubber which comprises vulcanizing in the presence of the reaction product of a mercapto benzenoid thiazole and a compound having the formula

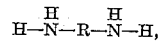

wherein R is an ethylene group.

2. The method of accelerating the vulcanization of rubber which comprises vulcanizing in the presence of the reaction product of a mercapto benzenoid thiazole and an alkylene diamine.

3. The method of accelerating the vulcanization of rubber which comprises vulcanizing in the presence of the reaction product of a mercapto benzenoid thiazole and an alkylene diamine.

4. The method of accelerating the vulcanization of rubber which comprises vulcanizing in the presence of the reaction product of a mercapto benzenoid thiazole and a compound having the formula

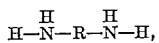

wherein R is an alkylene group.

5. A method of vulcanizing rubber which comprises subjecting the rubber to vulcanization in the presence of the reaction product of a poly primary aliphatic amine and mercaptobenzothiazole.

6. A rubber product vulcanized in the presence of the reaction product of an ethylene diamine and mercaptobenzothiazole.

7. A rubber product vulcanized in the presence of the reaction product of a poly primary aliphatic amine and mercaptobenzothiazole.

8. A method of accelerating the vulcanization of rubber which comprises vulcanizing in the presence of the reaction product of an aliphatic poly amine which contains at least two primary amino groups and a mercaptobenzenoid thiazole.

9. The method of vulcanizing rubber which comprises subjecting the rubber to vulcanization in the presence of the reaction product of ethylene diamine and mercaptobenzothiazole.

10. A rubber product vulcanized in the presence of the reaction product of ethylene diamine and mercaptobenzothiazole.

11. A method of accelerating the vulcanization of rubber which comprises vulcanizing rubber in the presence of the reaction product of mercaptobenzothiazole and an aliphatic poly amine which contains at least two primary amino groups.

12. A rubber product which has been vulcanized in the presence of a mercaptobenzenoid thiazole in combination with an aliphatic poly amine which contains at least two primary amino groups.

13. A rubber product which has been vulcanized in the presence of the reaction product of a mercapto benzenoid thiazole and an alkylene diamine.

LORIN B. SEBRELL.